(12) United States Patent
Kurtz et al.

(10) Patent No.: US 6,543,291 B1
(45) Date of Patent: *Apr. 8, 2003

(54) WET-TO-WET PRESSURE SENSING ASSEMBLY

(75) Inventors: Anthony D Kurtz, Ridgewood, NJ (US); Robert Gardner, Westwood, NJ (US)

(73) Assignee: Kulite Semiconductor Products, Inc., Leonia, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/479,292

(22) Filed: Jan. 6, 2000

(51) Int. Cl.$^7$ ............................................. G01L 13/02
(52) U.S. Cl. ...................................................... 73/716
(58) Field of Search ........................ 73/716, 715, 717, 73/721, 727, 720; 338/4, 42

(56) References Cited

U.S. PATENT DOCUMENTS

| | | | | |
|---|---|---|---|---|
| 4,072,058 A | * | 2/1978 | Whitehead, Jr. | 73/720 |
| 4,222,277 A | | 9/1980 | Kurtz et al. | |
| 4,285,244 A | * | 8/1981 | Green | 73/720 |
| 4,776,218 A | * | 10/1988 | Sawa et al. | 73/721 |
| 4,798,089 A | * | 1/1989 | Frick et al. | 73/706 |
| 4,798,090 A | * | 1/1989 | Heath et al. | 73/715 |
| 5,144,843 A | * | 9/1992 | Tamura et al. | 73/727 |
| 5,286,671 A | | 2/1994 | Kurtz et al. | |
| 5,400,655 A | * | 3/1995 | Tamai et al. | 73/706 |
| 5,520,054 A | * | 5/1996 | Romo | 73/715 |
| 5,891,751 A | | 4/1999 | Kurtz et al. | |
| 6,330,829 B1 | * | 12/2001 | Kurtz et al. | 73/717 |

* cited by examiner

Primary Examiner—Max Noori
(74) Attorney, Agent, or Firm—Duane Morris LLP (57) ABSTRACT

A wet-to-wet differential pressure sensing device including: a housing including first and second pressure receiving ports; a doubly stopped pressure sensor secured within the housing between the first and second ports; a first isolation diaphragm secured within the housing between the first port and the sensor; a second isolation diaphragm secured within the housing between the second port and the sensor; a first filling tube for introducing oil into a first cavity formed between the first diaphragm and the housing; and, a second filling tube for introducing oil into a second cavity formed between the second diaphragm and the housing; wherein the first and second filling tubes are accessible through a side wall of the housing being interposed between the first and second ports and the sensor and header are secured within the housing such that they are offset with respect to a center of the first diaphragm.

20 Claims, 9 Drawing Sheets

WET-TO-WET PRESSURE SENSING ASSEMBLY

FIELD OF INVENTION

The present invention relates to pressure transducers, and more particularly to an improved wet-to-wet differential pressure transducer.

BACKGROUND OF INVENTION

There are many types of pressure transducers for which there are many well known uses. One particular type of transducer is that conventionally characterized as being wet-to-wet and which can be used to measure the differential pressure between two fluid or gaseous substances for example. Wet-to-wet differential transducers are used in automotive, medical and aerospace applications.

Piezoresistive sensor structures are widely used in pressure or force measuring. Generally, the prior art is replete with a number of patents which describe various configurations and methods of fabricating piezoresistive pressure sensing devices. Typically, a piezoresistive device includes a bridge pattern of piezoresistive resistors which are formed on or within one side of a relatively thin deflecting member. The deflecting member, which may be fabricated from silicon, (as well as the resistors) deflects upon application of a pressure thereto which causes the piezoresistors to vary their magnitude as is well known. If a pressure P, is applied to one face of the deflecting member and a pressure P2 is applied to the other face of the deflecting member, the resulting deflection will be determined by the difference in pressure $P_1$–$P_2$. Thus, differential pressure measurements can be accomplished using a differential transducer, which provides an output, which is the difference between two pressures. Examples of both absolute and differential piezoresistive bridge pressure transducers are illustrated in commonly assigned U.S. Pat. No. 4,222,227, entitled "MEDIA COMPATIBLE PRESSURE TRANSDUCER", the entire disclosure of which is hereby incorporated by reference.

If oil-filled cavities are used in conjunction with media-isolation diaphragms, it is desirable to minimize the quantity of oil included in the oil-filled pressure communicating cavity to improve sensor performance. It is further desirable to miniaturize the pressure-sensing device as size and weight is often design considerations in many applications.

It is the object of the present invention to provide a miniaturized and hence improved wet-to-wet differential pressure-sensing device.

SUMMARY OF INVENTION

A pressure sensing device including: a housing including a first port and a second port; a pressure transducer secured within the housing between the first and second ports, said sensor having one face capable of being exposed to a pressure $P_1$ and the other face capable of being exposed to a pressure $P_2$ said sensors having overpressure stops in each direction, i.e. $P_1$ and $P_2$; a first isolation diaphragm, secured within the housing between the first port and the sensor; a second isolation diaphragm secured within the housing between the second port and the sensor, said isolation diaphragms serving to insure that the pressure media from the first and second ports do not directly touch the sensor; a first filling tube for introducing a fluid material into a first cavity located between the first isolation diaphragm and the sensor; and, a second filling tube for introducing fluid material into a second cavity located between the second isolation diaphragm and the sensor; wherein the first and second filling tubes are fastened to a side wall of the housing being interposed between the first and second ports, and each tube separately intersecting holes formed at right angles to the tubes, one hole going into the first cavity and connecting to the first tube and a second hole accessing the second cavity connected to the second tube.

DETAILED DESCRIPTION OF THE INVENTION

Basically, according to the present invention a header and a piezoresistive pressure sensor are disposed within a housing of a device and electrically coupled together. Two ports are provided for supplying pressures to be measured, and a thin isolation diaphragm is supplied adjacent to each of the ports. Oil filled cavities are formed behind the diaphragms and serve to communicate pressures received using the ports and diaphragms to respective surfaces of the pressure sensor. These applied pressures serve to deflect the sensor (the deflection being caused by the differences of the oppositely applied pressures and hence being indicative of the differential pressure), and a signal indicative of this differential pressure can be supplied using the sensor, header and electrical connection there between.

It has been discovered that a miniaturized differential pressure transducer can be formed by offsetting the sensor and header with respect to a center axis of the device, and by placing oil filling tubes out of a side surface of the device different from the surface on which the ports are supplied.

Figure 1:
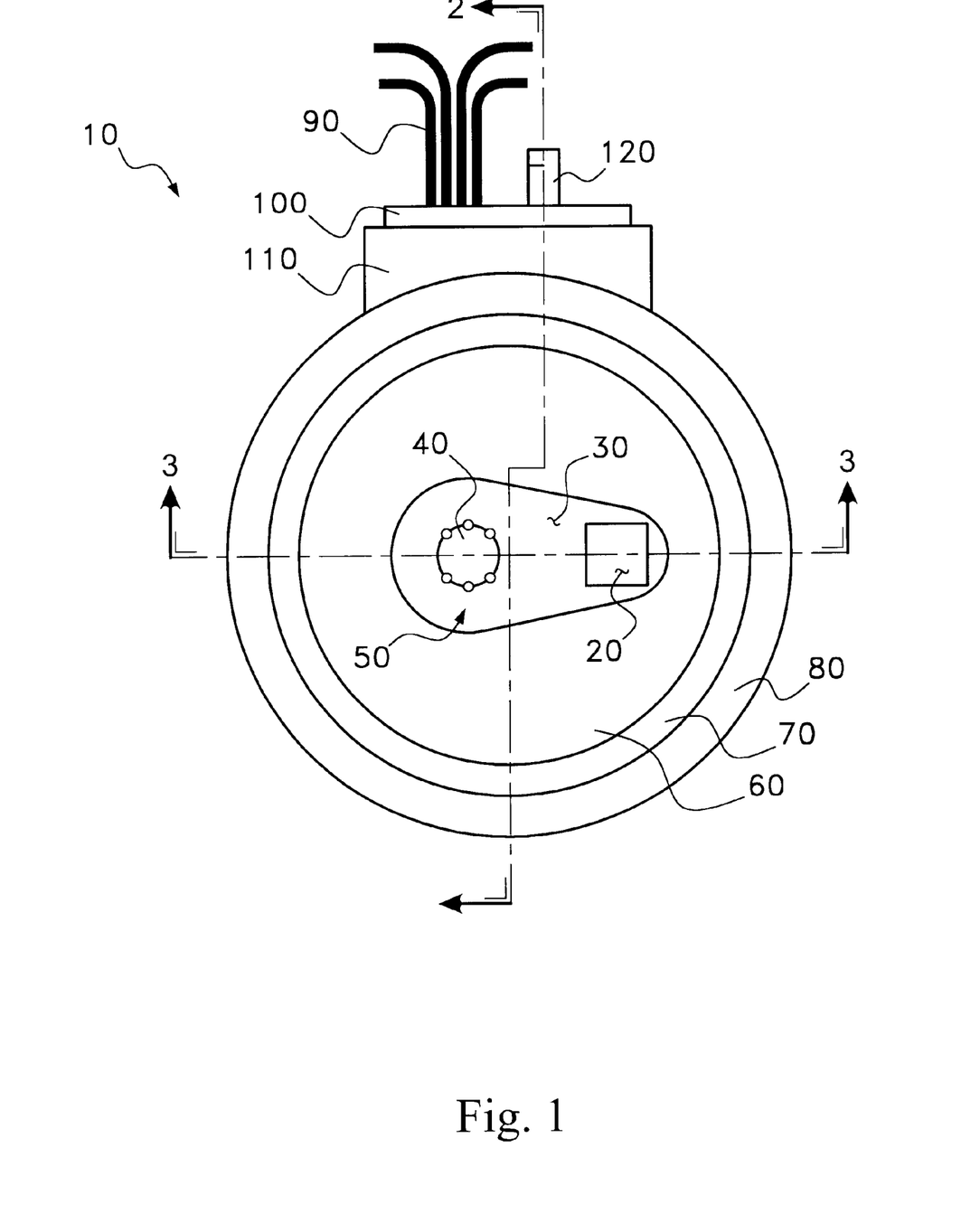
FIG. 1 illustrates an end view of the transducer device according to the present invention.

Referring now to the numerous figures, it is noted that like references identify like elements of the invention. FIG. 1 illustrates an end view of a preferred embodiment of the present invention. The device 10 includes a sensor 20, interconnection 30 and header 40 mounted below a pressure-communicating diaphragm 60. In the preferred embodiment, interconnection 30 takes the form of a flexible circuit board and specifically Kapton interconnect flex circuit, although any suitable interconnection means can be effectively utilized. The interconnection 30 serves to electrically couple the sensor 20 to the header 40 which serves to further electrically couple the sensor 20 beyond the device 10, i.e. to a monitoring system, display, microcontroller, etc., using wires 90 for example. The device 10 further includes a main housing 80 having a recessed portion 70 which has the pressure communicating diaphragm 60 secured therein. The diaphragm 60 serves to isolate the sensor 20 from the pressure transmitting media. The resultant device 10 is adapted for longer life as any deleterious effects which may be caused by direct exposure of sensor 20 to the media are avoided. Further, by using isolation diaphragm 60 contamination of the media due to direct exposure to the sensor 20 is also avoided.

Figure 2:
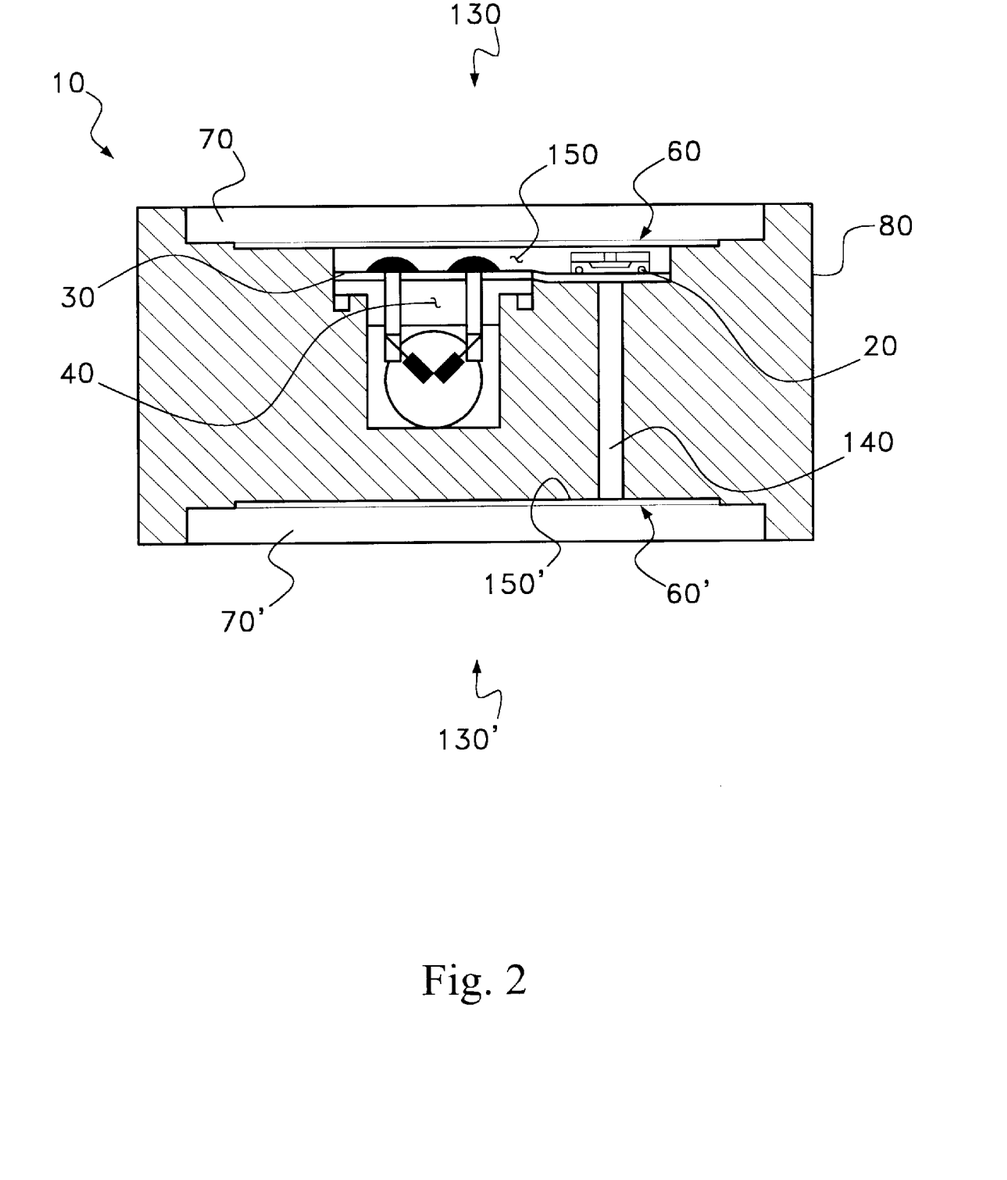
FIG. 2 illustrates a cross section 2—2 of the embodiment of FIG. 1.

Referring now also to FIG. 2, the diaphragm 60 and housing 80 form a cavity 150 in which the sensor 20 is secured and which cavity is filled with an appropriate oil. The oil selected is relatively incompressible so a pressure 130 applied to the diaphragm 60 is directly transferred to the sensor 20 through the oil. The pressure 130 applied to the sensor 20 through the oil filled cavity 150 effects the electrical characteristics of the sensor 20 as is well known. Accordingly, a signal is produced by the sensor 20 indicative of the applied pressure 130 using the interconnection 30 and header 40.

The transducer to be formed is intended to be a wet-to-wet differential device. A recessed portion 70' is preferably similarly formed on an oppositely disposed surface of the main housing 80 from the recessed portion 70. A diaphragm 60' is affixed within the recessed portion 70' and forms a cavity 150' in conjunction with housing 80. It is noted that for operation the cavities 150 and 150' should be of minimal depth such that the volume of oil on each side of the sensor is minimized. A channel 140 is provided through the main housing 80 to the sensor 20 and is also filled with the same oil type as the cavities 150 and 150'. Thus when a pressure 130' is applied it is communicated to the sensor 20.

One aspect of the present invention is to provide a device 10 of reduced size, and hence, an improved wet-to-wet differential pressure transducer. However, a major limitation in miniaturizing the device 10 is encountered in attempting to fill the cavities 150, 150' and channel 140 with the suitable oil. Fill tubes, which respectively open into cavities 150, 150' and extend into the recessed area 70' can be employed. In turn these fill tubes can then be folded over and crimped to be sealed. However, this results in a device 10 which cannot be sufficiently miniaturized, as the fill tubes must be of sufficient length to reach the cavity 150 and channel 140. The tubes when folded over, present an obstacle to miniaturization due to this required length. Thus, in order to fill the cavity 150, the recessed portion 70' must be of sufficient size to hold the oil fill tubes once they have been folded over and to enable the securing of the diaphragm resulting in a larger oil volume. Additionally, the recessed portions 70, 70' are preferably adapted to be coupled to other tubes, ports or pipes to provide the pressures to be measured thereto (i.e., they also serve as ports). For example, an interior surface of the housing 80 in the recessed portion 70', above the diaphragm 60' can be threaded so as to accept a threaded port, for example.

Referring to FIGS. 1 and 2, it has been found by offsetting the position of the sensor 20 and header 40 from the center of the recessed portion 70, in combination with a unique configuration for the tubes for filling the cavities 150 and 150' and channel 140, these limitations 10 can be overcome.

Figure 3:
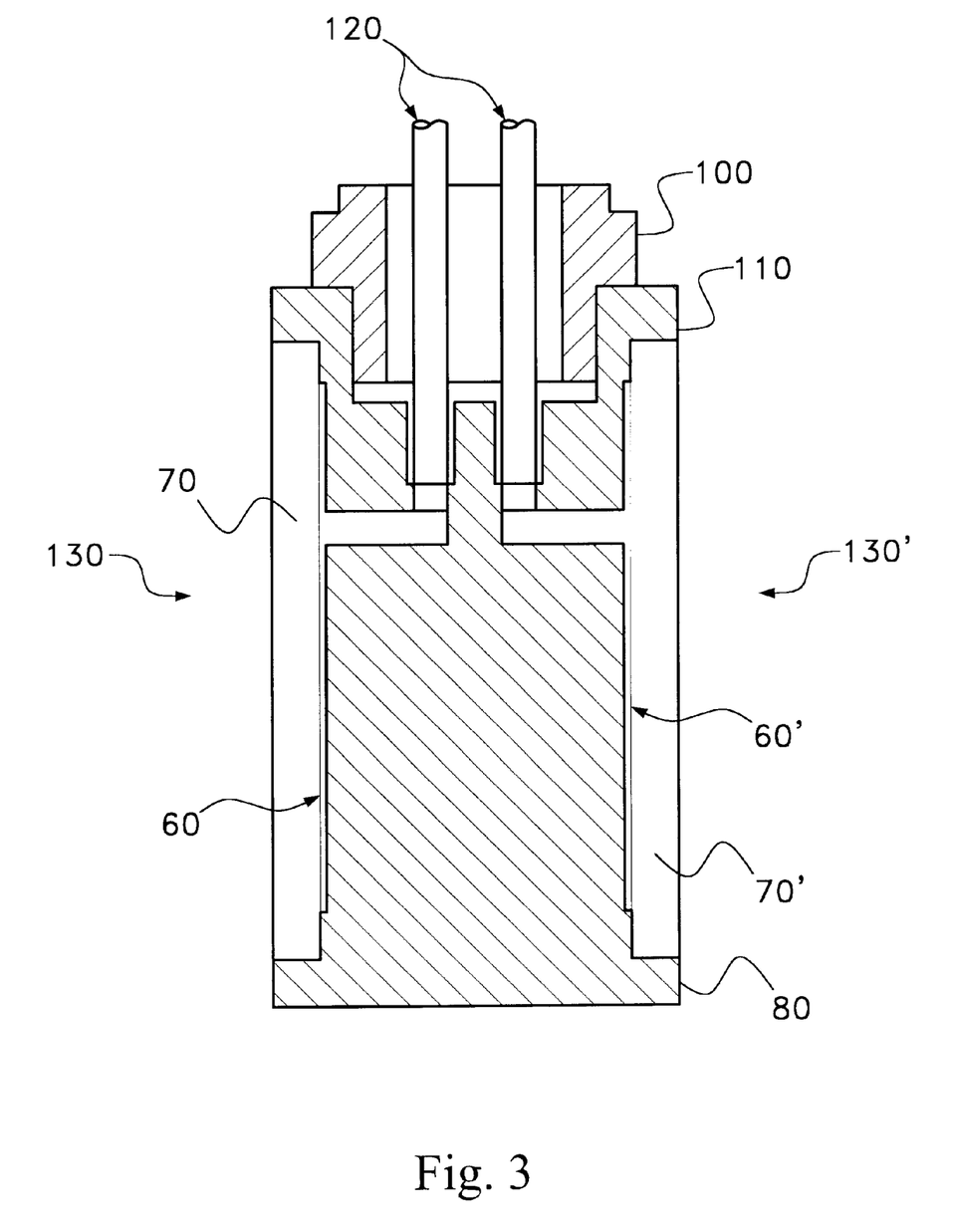
FIG. 3 illustrates a cross section 3—3 of the embodiment of FIG. 1.

Referring now to FIG. 3, therein is illustrated a cross section 3—3 of the device 10. Basically, oil fill tubes 120 are provided such that they do not extend into either recessed portion 70 or 70' in order to be accessed, but rather are fed out one of the sides of the main housing 80 between the recessed portions 70, 70' such that they can be accessed to fill the cavities 150, 150' and channel 140 with suitable oil. As one can see, each of the holes to which the tubes are connected have the same minimum length and diameter. Thus, if the plane of the isolation diaphragm is vertical, there will be no pressure differences due to gravity because the tubes and the holes are the same dimension. Moreover, when the plane of the isolation diaphragm is horizontal, the minimal length of the holes and the fact that they are equal in length insures that there will be a minimum pressure column of oil on the sensor and that when the plane of the isolation diaphragm is rotated through 180° while still being horizontal, there will be no change in the net displacement of the active region of the sensor. Additionally, as illustrated in FIG. 1, wires 90 can further be fed through the same side of the main housing 80 as the oil fill tubes 120. Again, the wires 90 are coupled to the sensor 20 using header 40 and interconnect 30.

The housing is preferably provided with a port 110 and adapter 100 through which the oil fill tubes 120 and wires 90 are fed. The main housing 80, port 110 and adapter 100 are formed of stainless steel in the preferred embodiment, although any suitable material for the intended application could of course be utilized. The port 110 is preferably welded, brazed or otherwise coupled to the main housing 80 at suitable locations, and the adapter 100 is preferably welded, brazed or otherwise suitably coupled to the port 110 using conventional means. Further connections can be made by threading an interior or exterior of the adapter 100 and then coupling it to a threaded piece of conduit for example, through which the wires 90 may be run.

Using this configuration, the oil fill tubes 120 can be used to adequately fill the cavities 150, 150' and channel 140 with suitable oil without adversely affecting the final dimensions of the device 10. The recessed portions 70 and/or 70' no longer need to be of the necessary dimensions to allow the oil fill tubes 120 to be folded within the recess.

Figure 4A:
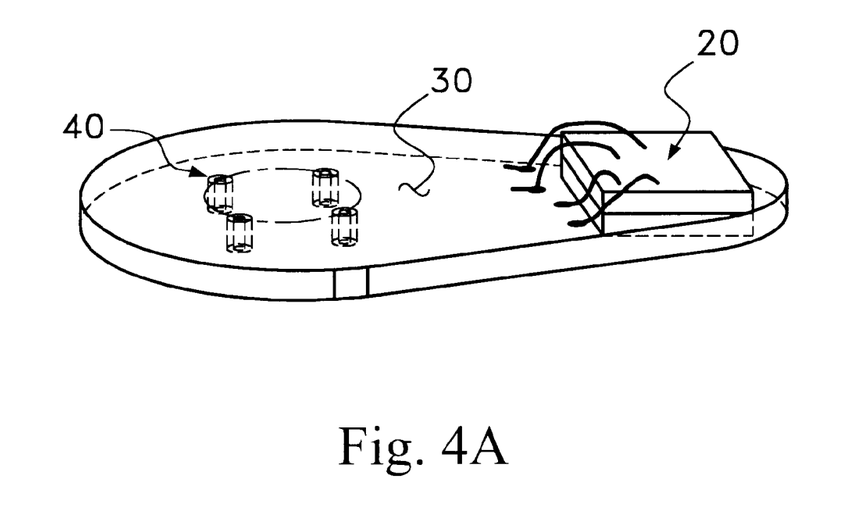
FIG. 4A illustrates a partial perspective view of the embodiment of FIG. 1.
Figure 4B:
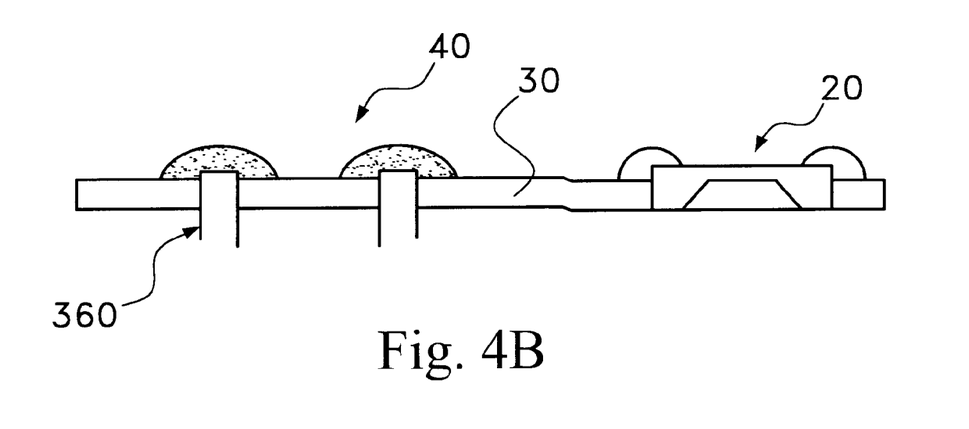
FIG. 4B illustrates a cross-section of the embodiment of FIG. 4A.

Referring now also to FIGS. 4A and 4B, therein is illustrated an enlarged perspective view of the sensor 20, interconnect 30 and header 40. As set forth, in combination with the novel oil fill tube configuration, by offsetting the header 40 and sensor 20 from the center of the diaphragm 60 it is possible to substantially miniaturize the device 10. For example, using the configuration according to the instant invention a device 10 can be manufactured which is approximately 33%–50% smaller than using the approach of accessing the oil fill tubes through the recessed area 70'.

Figure 5A:
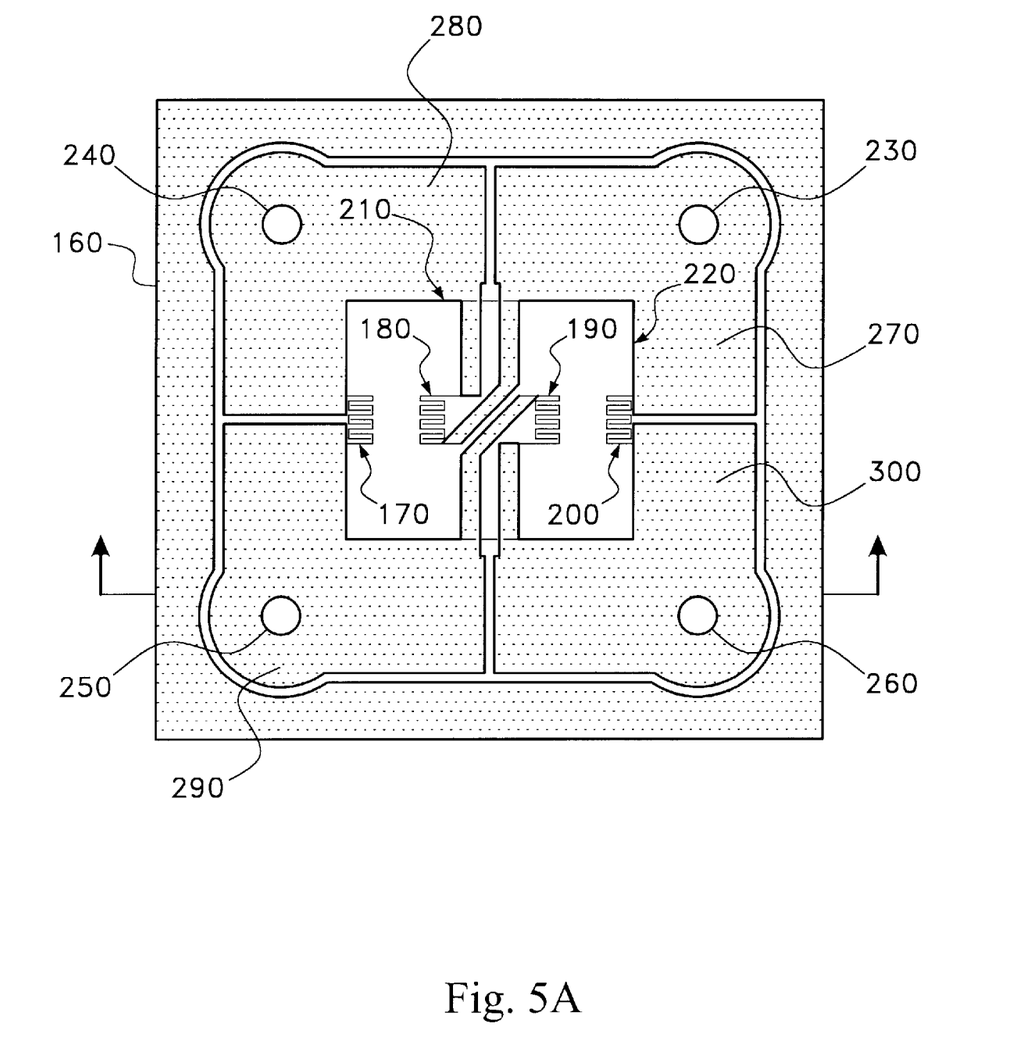
FIG. 5A illustrates a plan view of a preferred form of a piezoresistive closed bridge structure sensor utilized according to the present invention.

FIG. 5A illustrates a plan view of a sensor 20 particularly well suited for the preferred embodiment of the present invention. Such a sensor structure is described in commonly assigned U.S. Pat. No. 5,891,751, entitled "Hermetically Sealed Transducers and Methods for Producing the Same", the entire disclosure of which is incorporated by reference herein. A piezoresistive bridge structure 160 is shown which can be used in accordance with the teaching of the present invention. The pressure sensitive structure 160 is of the type having serpentine or tortuous piezoresistors 170, 180, 190, 200 composed of highly doped (P+) silicon. Each (piezoresistor 170 180, 190, 200 is essentially a variable resistor in one of four legs of a Wheatstone bridge circuit with each of the respective resistances varying in response to an applied force or pressure to the transducer 20. The portion of the bridge structure 160 defined within the dotted lines 210 is generally referred to as the "active area" 220 of the transducer since this area 220 overlays a thinner region that deflects upon the application of a pressure to the sensor (by the oil for example). The areas of the transducer 20 that are external to the active area 220 are termed the "non-active" areas.

Figure 5B:
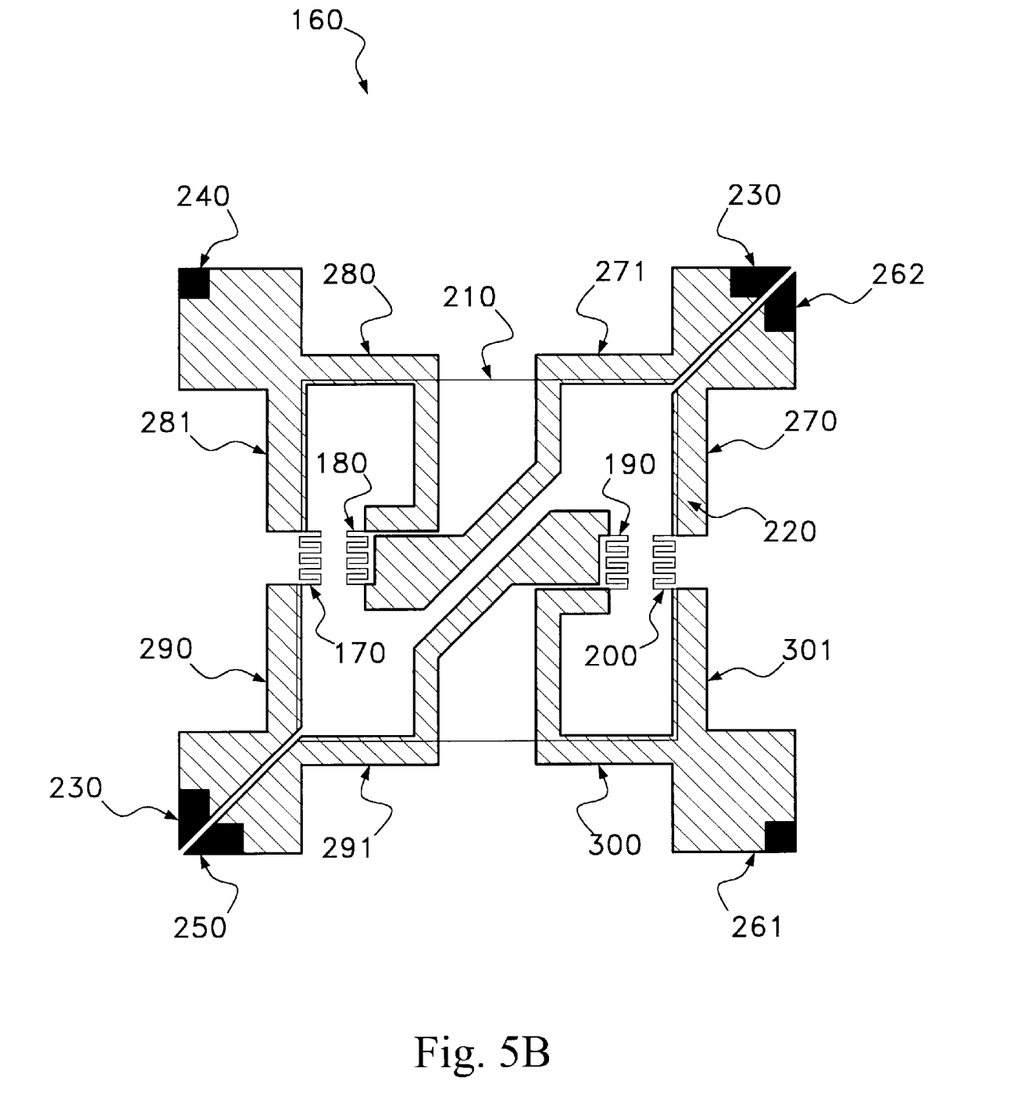
FIG. 5B illustrates a plan view of a preferred form of a piezoresistive open bridge structure sensor utilized according to the present invention.

For a closed bridge the four circuit nodes of the Wheatstone bridge consist of electrical contacts 230, 240, 250, 260, and are located in the non-active areas of the transducer. Interconnecting the contacts 230, 240, 250, 260 with the piezoresistors 170, 180, 190, 200 are electrical interconnections 270, 280, 290, 300, which are also formed of P+ silicon. It is noted that the contacts 230, 240, 250, 260 being doped P+ are conductive, as are the interconnections 270, 280, 290 300, to allow ohmic contact between the piezoresistive array and the respective contacts. It should be understood, while the terms "electrical contacts" and "interconnections" are used for convenience, it is understood that these terms can be considered together to essentially consist of integral electrical contacts that electrically couple the piezoresistor elements with the interconnect 30. The interconnections 270, 280, 290, 300 are wider than the piezoresistors 170, 180, 190, 200 to provide a low resistance path to the contacts 230, 240, 250, 260, while the long, tortuous lengths and narrow widths of the piezoresistors are designed to prove a desired resistance for those elements. For an open bridge, as shown in FIG. 5B, six contact areas can be employed by adding two additional contact areas 261 and 262 and by adding interconnection 271, 281, 291, and 301. External leads (not shown) can be readily attached to each contact 230–260 to supply a bias voltage to two opposite nodes of the bridge (such as contacts 240, 260) and to the externally measure the voltage between the two other nodes (such as contacts 230 and 250). In the preferred form these leads take the form of flexible circuit 30 and more particularly a Kapton flex-circuit. One can readily determine the applied pressure from the measured voltage. The structure 160 is deposited or otherwise formed using a conventional technique onto a wafer to form a dialectically isolated silicon sensor 310, such as that taught in commonly assigned U.S. Pat. No. 5,286,671 entitled "Fusion Bonding Technique for Use in Fabricating Semiconductor Devices." The entire disclosure of U.S. Pat. No. 5,286,671 is also incorporated by reference herein.

Figure 5C:
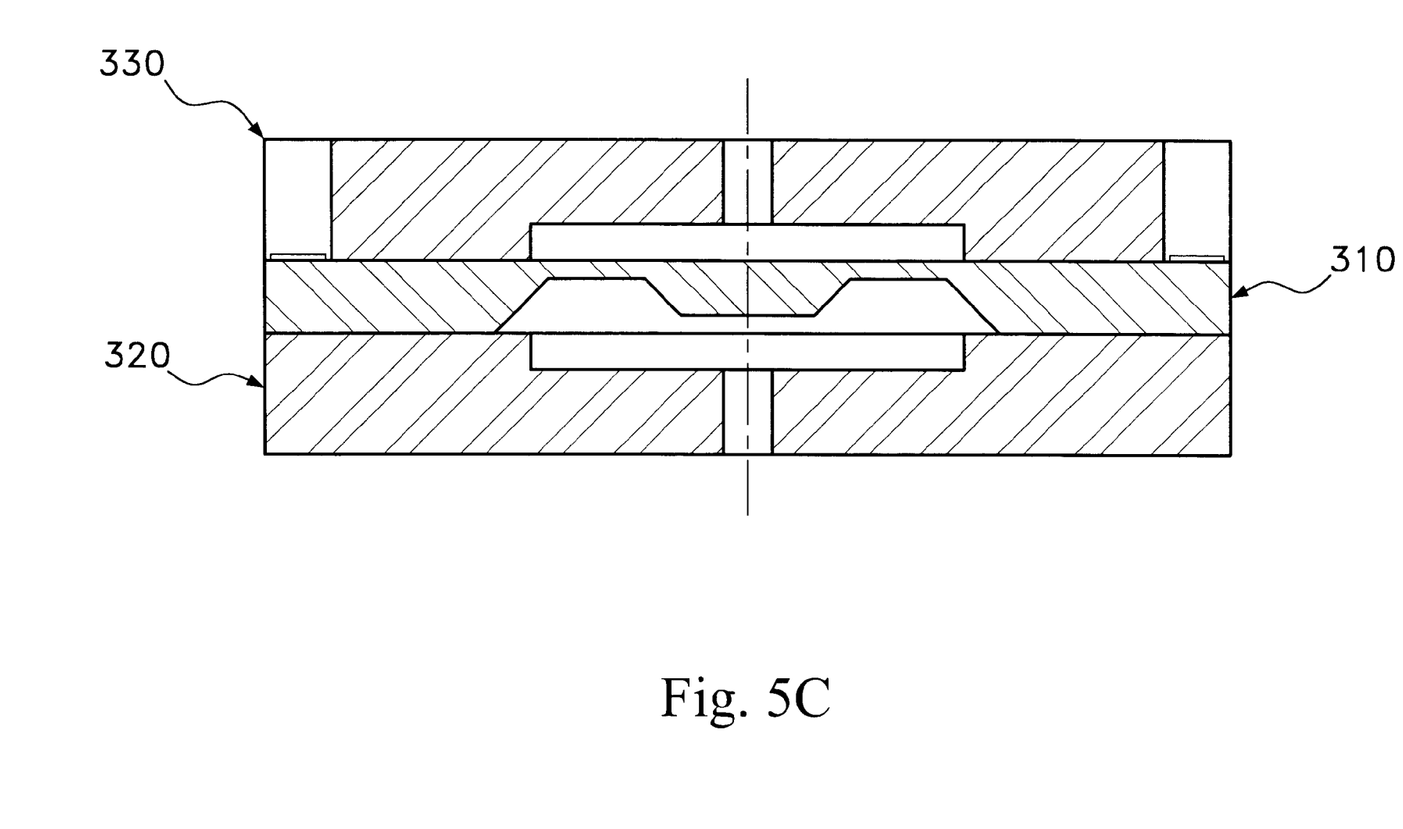
FIG. 5C illustrates a cross-section of the pressure sensor utilized according to the present invention.

Referring to FIG. 5C, therein is illustrated a cross-section of the preferred form of the sensor 20. The silicon sensor 310 is bonded to glass portions 320 and 330. The sensor itself is composed of three separate segments, a top piece of Pyrex glass having an aperture to allow pressure to act on one face of the intermediate piece of silicon, as well as additional apertures to access the terminal areas of the fingers on the silicon, the silicon itself which was previously described and a second piece of Pyrex glass which also contains an aperture which allows pressure to access the other face of the silicon. In the central section of each Pyrex piece is a central shallow depression of about the same size as the active portion of the silicon sensor. When pressure is applied to the silicon through either of the central apertures in the glass, the active portion of the silicon will deflect, and will continue to deflect until it makes contact with the Pyrex above the depression in the Pyrex, thus preventing further deflection of the active portion of the silicon and thereby acting as a "stop." Since each Pyrex piece is similarly constructed there will be a "stop" for pressure applied in either direction with respect to the silicon surface.

Figure 6A:
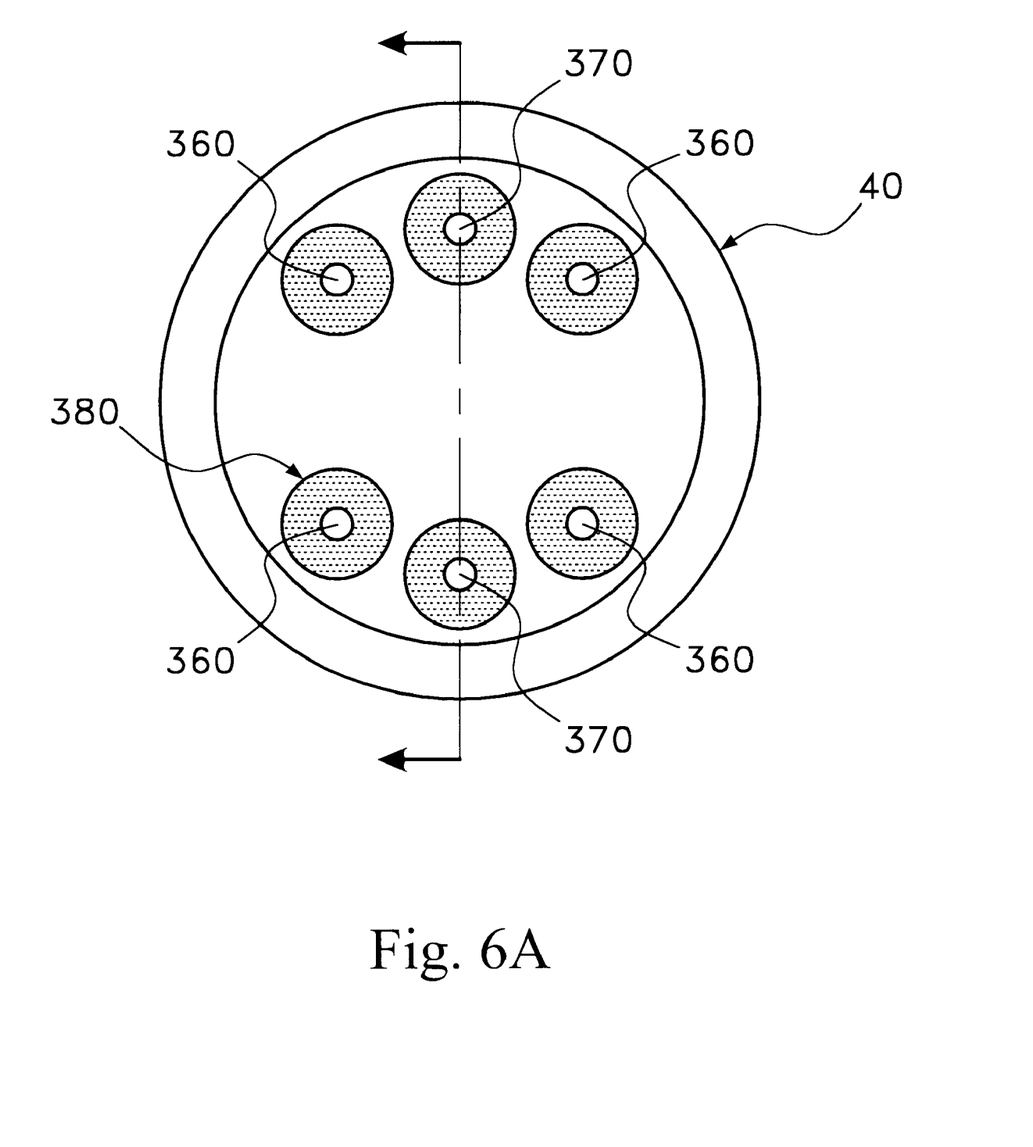
FIG. 6A illustrates a plan view of a preferred form of a header utilized according to the present invention.
Figure 6B:
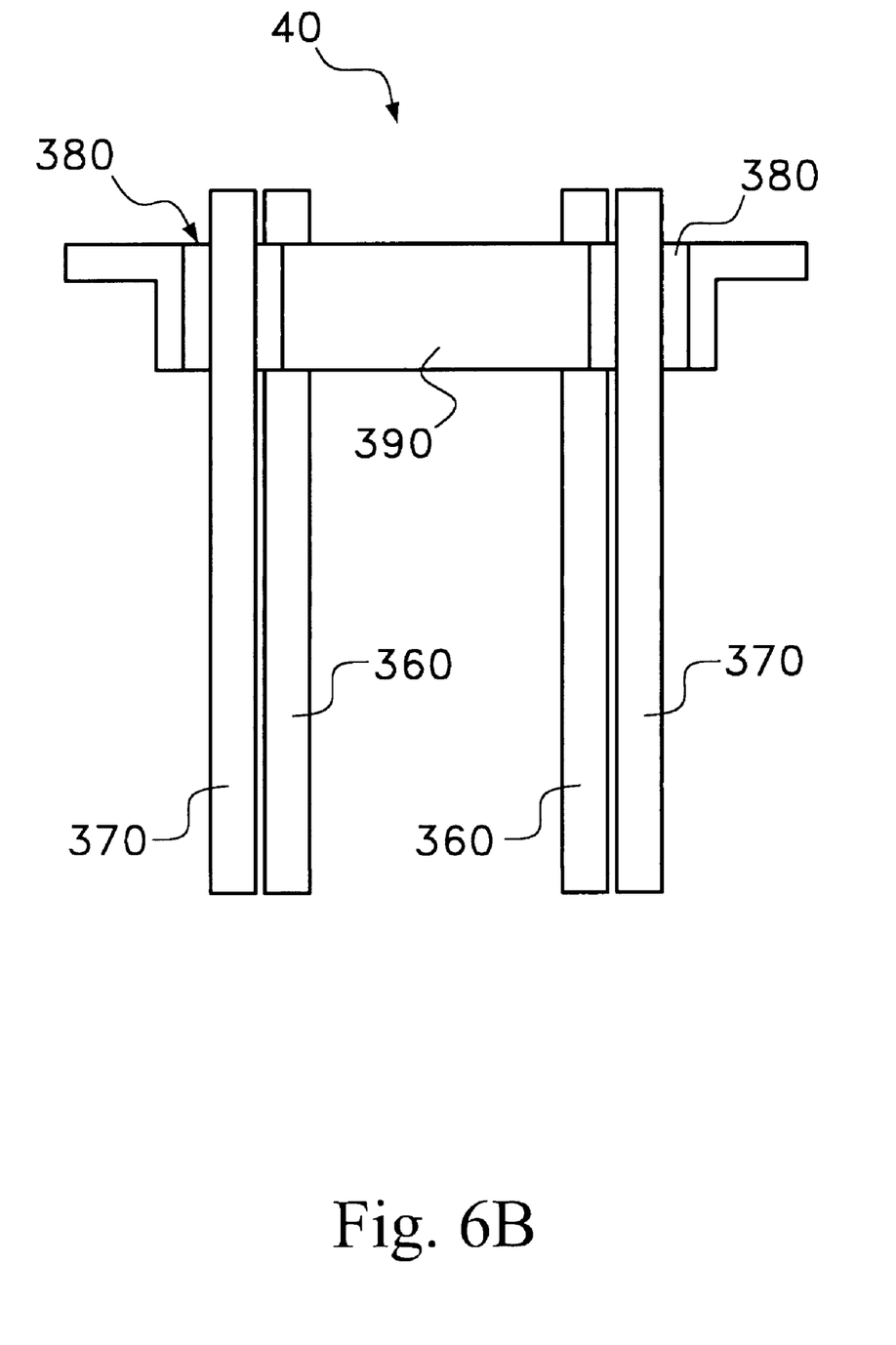
FIG. 6B illustrates a cross-section of the header of FIG. 6A.

Referring now to FIGS. 6A and 6B, therein is illustrated a header 40 particularly well suited for the preferred embodiment of the present invention. As set forth, the header 40 serves to electrically couple the interconnect flexible circuit 30, and hence the sensor 20, to the wires 90. The header 40 includes pins 360 each respectively electrically coupled to interconnect flex-circuit 30 and wires 90 (see for example FIG. 2 also). The header 40 further preferably includes pins 370 which may be electrically coupled to the sensor 20, in order to permit the electrical equivalent of an open bridge to be measured using the sensor 20 by coupling particular ones of wires 90 thereto. Each of the pins 360 and 370 are preferably surrounded by a glass seal 380 which serve to respectively electrically isolate the pins 360, 370 from portion 390 of the header 40 for example. Any suitable means of respectively electrically coupling the pins 360 to the associated wires 90 can be used, such as soldering for example (see FIG. 2).

Although the invention has been described and pictured in a preferred form with a certain degree of particularity, it is understood that the present disclosure of the preferred form has been made only by way of example, and that numerous changes in the details of construction and combination and arrangement of parts may be made without departing from the spirit and scope of the invention as hereinafter claimed. It is intended that the patent shall cover by suitable expression in the appended claim, whatever features of patentable novelty exist in the invention disclosed.

We claim:

1. A differential pressure transducer comprising: a housing having a first end containing a first recess, and oppositely disposed second end containing a second recess and at least one sidewall interposed between said first and second ends;

first and second isolation diaphragms respectively enclosing said first and second recesses and forming in conjunction therewith first and second cavities;

a first tube communicable through a hole with said first cavity and protruding from said sidewall, and a second tube communicable with said second cavity through a hole and protruding from said sidewall, said first and second tubes being adapted to accommodate a fluid for substantially filling said first and second cavities; and a doubly "stopped" silicon sensor secured within said housing between said first and second cavities and being responsive to a first pressure applied to said first diaphragm and a second pressure applied to said second diaphragm to produce at least one signal indicative of a difference between said first and second pressures and being capable of withstanding an excess pressure in either direction.

2. The pressure transducer of claim 1, further comprising a header electrically coupled to said sensor and secured to said housing.

3. The pressure transducer of claim 2, wherein said header is further electrically coupled to a first end of at least a first wire having a second end which also at least partially protrudes from said sidewall of said housing and substantially adjacently to said first and second tubes.

4. The pressure transducer of claim 3, wherein said first diaphragm has a center, and said sensor and header are secured within said housing such that they are substantially oppositely offset with respect to said center of said first diaphragm.

5. The pressure transducer of claim 4, wherein said fluid is an oil.

6. The pressure transducer of claim 5, wherein said oil fills said first and second cavities after being introduced using said first and second tubes.

7. The pressure transducer of claim 6, wherein said header and said sensor are electrically coupled using a flexible circuit.

8. The pressure transducer of claim 7, further comprising an adapter coupled to said sidewall of said housing and adapted for passing said second end of said at least one wire there through.

9. The pressure transducer of claim 8, wherein said housing is at least partially formed of stainless steel.

10. A device for providing a signal indicative of a difference in two pressures comprising:
   a housing including first and second ends and a sidewall secured between said first and second ends;
   a recess in said first end of said housing and a second recess in said second end of said housing;
   a first diaphragm covering said first recess and a second diaphragm covering said second recess, said first and second diaphragms being adapted to respectively receive first and second pressures;
   a first tube communicable with said first recess and adapted for accommodating a fluid for adequately filling said first recess; and a second tube communicable with said second recess and adapted for accommodating a fluid for adequately filling said second recess, said first and second tubes at least partially protruding out of said sidewall and substantially parallel with one another; and
   a doubly stopped sensor secured within said housing and adapted to produce a signal indicative of a difference between said first and second pressures.

11. The device of claim 10, wherein said housing further comprises a channel between said second recess and said sensor and communicable with said second recess, and said first and second recesses and said channel each respectively contain an oil.

12. The device of claim 11, wherein said housing has a longitudinal center axis and said pressure sensor and header are secured to said housing such that they are respectively offset with respect to said center axis.

13. The device of claim 12, wherein said channel is offset with respect to said center axis.

14. The device of claim 13, wherein:
   said first diaphragm and oil in said first cavity are adapted to communicate said first pressure to said sensor; and
   said second diaphragm, oil in said second cavity and oil in said channel are adapted to communicate said second pressure to said sensor.

15. The pressure sensing device of claim 14, wherein said header is further electrically coupled to at least a first end of a first wire having a second end which at least partially protrudes out of said sidewall of said housing and substantially adjacently to said fill tubes.

16. The device of claim 15, further comprising a port coupled to said sidewall of said housing and adapted to have said second end of said at least one wire passed there through.

17. The device of claim 16, wherein said header and said sensor are electrically coupled together using a flexible circuit.

18. An improved wet-to-wet differential pressure sensing device comprising:
   a housing including a first pressure receiving port and a second pressure receiving port;
   a doubly stopped pressure sensor secured within said housing between said first and second pressure receiving ports;
   a header electrically coupled to said pressure sensor and secured within said housing;
   a first isolation diaphragm having a center and secured within said housing between said first pressure receiving port and said sensor; and,
   a second isolation diaphragm secured within said housing between said second pressure receiving port and said sensor;
   wherein said pressure sensor and header are secured within said housing substantially oppositely offset with respect to said center of said first diaphragm.

19. The device of claim 18, wherein said first diaphragm and said housing cooperatively form a first cavity being filled with oil, said second diaphragm and said housing cooperatively form a second cavity being filled with oil, and said housing further comprises a channel being filled with oil and extending between said second cavity and said pressure sensor, whereby a pressure received using said first pressure receiving port is communicated to said pressure sensor by said first diaphragm and oil contained within said first cavity, and a pressure received using said second pressure receiving port is communicated to said pressure sensor by said second diaphragm, said oil contained in said second cavity and said oil contained in said channel.

20. The device of claim 19, further comprising:
   a first oil fill tube having a first end which opens into said first cavity and a second end;
   a second oil fill tube having a first end which opens into said second cavity or said channel and a second end;
   wherein said first oil fill tube is adapted to introduce oil into said first Cavity, and said second oil fill tube is adapted to introduce oil into said second cavity and channel and,
   wherein said second ends of said first and second oil fill tubes at least partially protrude out from a side of said housing being separate from said first and second pressure receiving ports.

* * * * *